Jan. 9, 1940. R. L. SCOGGIN 2,186,212
ELECTRIC TESTER
Filed Aug. 2, 1938 2 Sheets-Sheet 1
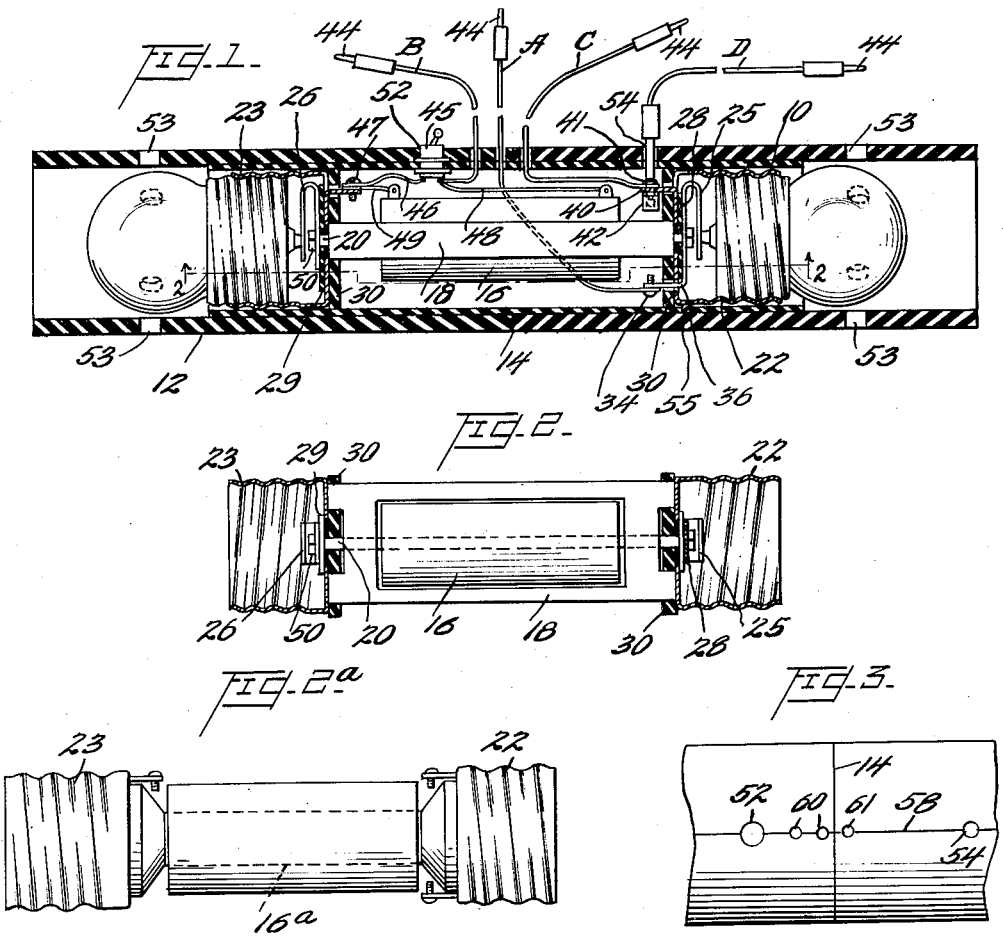
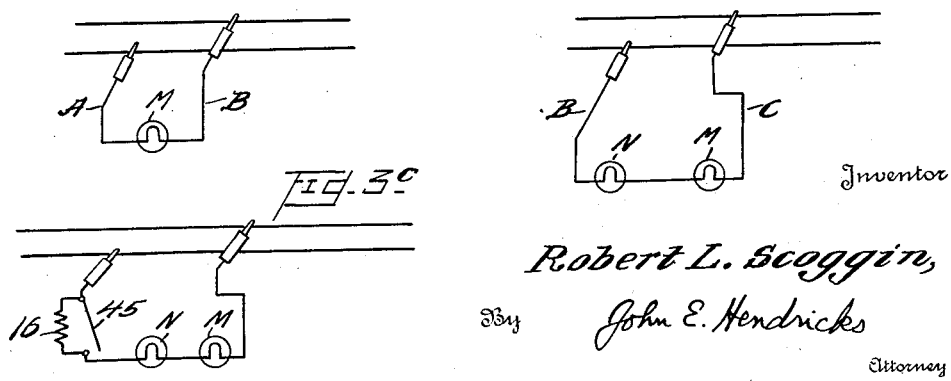
Inventor
Robert L. Scoggin,
By John E. Hendricks
Attorney

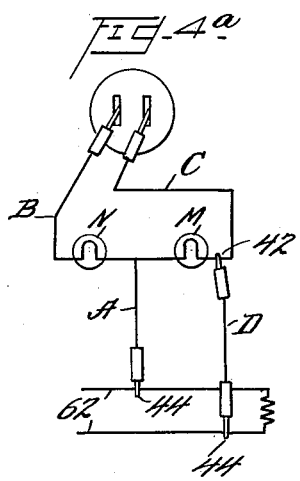
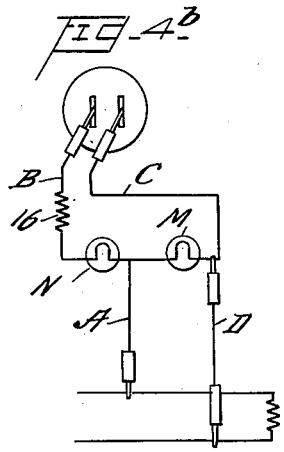
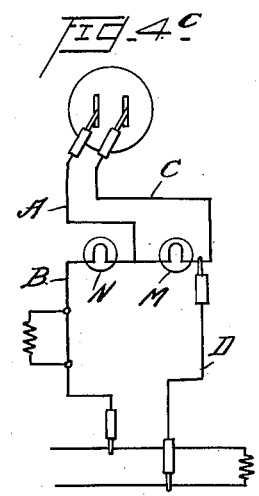
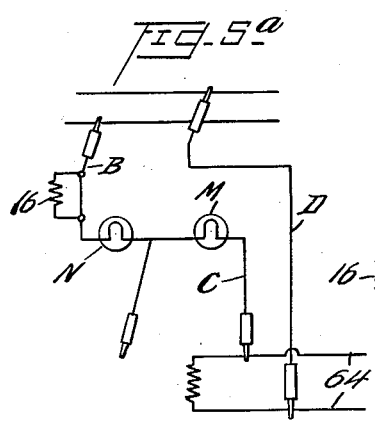
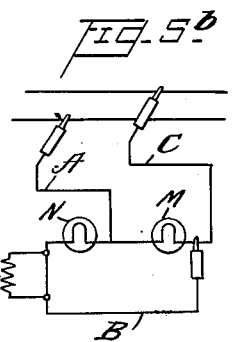
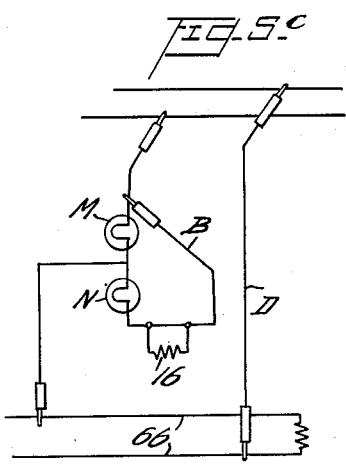
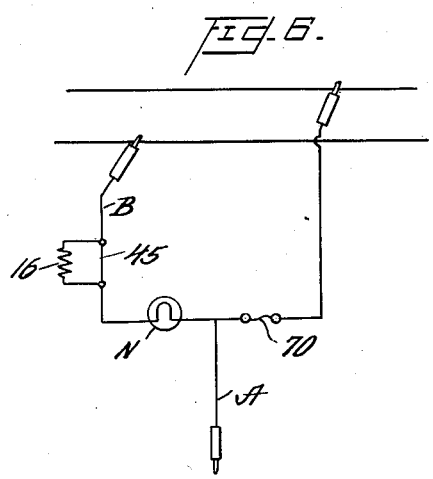
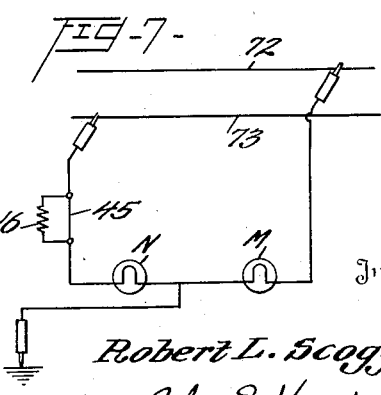

Patented Jan. 9, 1940

2,186,212

UNITED STATES PATENT OFFICE 2,186,212

ELECTRIC TESTER

Robert L. Scoggin, Ventura, Calif.

Application August 2, 1938, Serial No. 222,708

10 Claims. (Cl. 175—183)

This invention relates to portable testing devices used by electricians and test men in making circuit tests and has for its primary object the provision of a compact, light but sturdy tester which may be carried in the pocket.

Another object is to provide a tester which is of extremely simple design and which may be easily made up from stock material readily obtainable on the market.

A further object is to provide a tester giving visible indications or light signals of different intensities to show different circuit conditions.

A still further object is to provide a compact circuit tester which may also be used as a rheostat and as a voltmeter so that not only can the tester be used for ordinary 110 and 220 volt circuits but it can be used for obtaining lower voltages and for making tests on low voltage delicate circuits.

I carry out the objects of my invention in a set that is of the same shape and size as the ordinary two cell cylindrical flashlight. The set consists of two light sockets secured together in spaced relation and having between them a resistance unit of cylindrical shape all inclosed in a strong fiber case of tubular form which case is in turn inclosed in a two part rubber sleeve that extends a considerable distance at each end beyond the fiber case so that the set may be dropped without injuring the lamps in the sockets. Four flexible cords complete the set; three of these cords being permanently secured to the proper contacts and the fourth cord being removable to permit changing the circuit connections when necessary to carry out desired tests.

Figure 1 is a central longitudinal sectional view of the tester.

Figure 2 is a sectional view taken on line 2—2 of Figure 1.

Figure 2a is a view of a modification of the body.

Figure 3 is a fragmentary view of the casing.

Figures 3a to 7 are circuit diagrams showing the device connected for different tests.

Referring to Figure 1, a fiber tube 10 of strong insulating material is centrally located within a rubber casing 12 which casing is made of two cylindrical sleeves contacting each other at the middle 14 of the set. Centrally located in the tube 10 is a fiber spacing element 18 which is preferably a rectangular frame surrounding and supporting a resistance unit 16 of the usual cylindrical shape. The resistance unit is held in the frame by a bolt 20 passing through the spacer 18 and the resistance unit 16 and holding the two socket shells 22 and 23 securely against the end of the spacer and also holding the central contacts 25 and 26 of the two sockets. These central contacts are respectively insulated from the base of their proximate socket shells 22 and 23 by the insulating washers 28 and 29. A second insulating washer 30 serves to center the sockets in the tube 10.

A test cord A is secured to the contact screw 34 which in turn is connected to the central rod 20 by means of a conductor 36. Thus the test cord A is electrically connected with the center contacts 26 of each socket. The socket shell 22 is provided with a lug 40, which carries a screw 41 and a spring contact 42. The test cord C is secured to the lug by means of the screw 41 and the spring contact 42 provides a detachable connection for the test cord D. Each of the test cords is provided with a prong 44 shaped to engage between the prongs of an ordinary convenience outlet and the spring contact blade 42 is of the same shape as those found in such outlets so as to receive any one of the prongs 44 on the test cords. The test cord B is electrically connected to the socket shell 23 by way of a switch 45, conductor 46 and the screw 47 but when the switch 45 is open the test cord B is electrically connected with the socket shell 23 by way of the conductor 48, resistance unit 16, conductor 49 and a screw 47. A lamp, preferably of the 110 volt size, is screwed in each socket to complete the set. The lamps and the resistance unit should all be of the same wattage in order to provide a flexible test set that may be used for making the greatest number of different kinds of tests without changing the lamps for lamps of different sizes.

The new set may be quickly assembled because of the simplicity and the symmetry of arrangement of the parts. The shells 22 and 23 are secured to the rectangular spacer 18 by means of the bolt 20 which is first threaded through the resistance unit 16 and other elements before applying the nut 50 to hold the parts of the body in assembled relation as shown in Figure 1. The conductors are then attached to the terminals 34, 41 and 47 and the thus assembled parts are inserted in the tube 10, the conductors being threaded through apertures provided in the tube wall. Three of these conductors, 46, 48 and B are threaded through the switch receiving opening 52. The body is then turned in the shell until the terminal 42 registers with the opening 54 at which time a set screw 55 is inserted to prevent further movement of the body in the tube 10. The sleeve aids in holding the set screw 55 in place and at the same time insulates it from accidental contact. The switch 45 is now connected to the conductors 46, 48 and B and is then secured to the tube in the opening 52 and the two parts of the sleeve 12 are pushed over the tube into abutting relation. The rubber sleeve is split longitudinally as indicated at 58 in Figure 3, and in addition apertures 59, 60, 61 and 62 may be provided for the switch 45 and the test cords A, B, C and D. Instead of the rectangular spacer 18 I find it sometimes desirable to use a spool-shaped element such as 16a shown in Figure 2a, the resistance wire being wound directly on the spool.

The method of using my test set is diagrammatically indicated in Figures 3a to 7. In Figure 3a is shown the manner of testing for current in a circuit, only one lamp being used, (lamp M) if a 120 volt circuit, but both lamps being used as shown in Figure 3b if a 240 volt circuit. In Figure 3c the switch 45 is shown in open position for testing a 550 volt circuit. The lamps in Figure 3b will begin to glow visibly if twenty volts are on the line but will be of full brilliance at 240 volts and with a little practice one may roughly judge the voltage of the line by the degree of brilliancy of the lamps. The same is true when the lamps are connected as shown in Figure 3c except that the first visibility occurs at about fifty volts and full brilliancy will be had at 550 volts. The lamps may be observed from the ends of the casing or through the apertures 53 provided in the casing walls.

The method of testing appliances for open or short circuits is shown in Figures 4a to 4c. In Figure 4a the test cords B and C are inserted in the spring terminal 42. This hook-up gives 60 volts across the test cords A and D, which is sufficient to test an ordinary appliance. If the circuit indicated at 62 is shorted then the lamp M will be extinguished and lamp N will become brighter but if the circuit 62 is open no change will be noted in the brilliancy of lamps M. For making tests of more delicate circuits the switch 45 is open which connects the resistance 16 in series with the lamps and provides 25 volts across the test cords A and D. By inserting the test cords A and C in a convenience outlet, as shown in Figure 4c, 120 volts is obtained across the test plugs B and D but the amperage is cut down about two-thirds.

The diagram in Figure 5a shows the method of connecting a circuit 64 to be tested in series with the lamps M and N or when switch 45 is open the resistance 16 is added in series with the lamps; in this test the cord A is not used. In Figure 5b the prong of the test cord B is inserted in the terminal 42 which puts lamp N in parallel with lamp M for making certain tests requiring more current. The diagram shown in Figure 5c is similar to that shown in Figure 5a except that lamps M and N are connected in parallel for giving additional current in testing a circuit 66.

In Figure 6 the method is shown for protecting the test set by substituting a fuse 70 for one of the lamps, for example, lamp M. This connection is used on rare occasions for testing a circuit of unknown voltage.

In Figure 7 is shown the method of determining which side of a line is grounded. The test cords B and C are connected to the two lines 72 and 73 then the test cord A is touched to ground. If lamp M glows and lamp N is extinguished this indicates that line 72 is grounded. If lamp N glows and lamp M goes out this indicates that the other line is grounded.

What I claim is:

1. In an electrician's test set a tubular casing, a lamp socket operatively mounted in each end of the tube, a spacer between said sockets, a resistance element supported by said spacer, a straight electrical conductor positioned axially of the element and spacer for connecting said sockets together and to the spacer and a plurality of test cords electrically connected to the sockets and to the resistance element.

2. The device of claim 1 in which said spacer is a hollow frame and the resistance element is carried in said frame.

3. In an electrician's test set a tubular casing, a lamp socket operatively mounted in each end of the tube, a spacer comprising a rectangular frame located between the sockets, a bolt passing centrally through the frame and connecting the sockets together and to the frame, a resistance element held in the frame by the bolt, and a plurality of test-cords connected respectively to the sockets and to the resistance element.

4. The device of claim 1 in which a switch is provided for short circuiting the resistance.

5. In a test set a rigid tube of insulating material, a lamp socket operatively mounted in each end of the tube, an insulating element between the sockets, a resistance coil supported on the insulating element, a bolt passing centrally through the coil and through the element for means connecting the sockets to each other, electric conductors connecting the sockets and the resistance coil, test cords conected to said coil and sockets and a flexible casing around said tube and projecting beyond each end, said casing being provided with apertures for permitting observation of lamps in said sockets.

6. The device of claim 5 in which each test cord is provided with a terminal prong adapted to fit in the usual convenience outlet, and a spring terminal electrically connected to the shell of one of said sockets for receiving any one of said prongs.

7. In a test set a pair of oppositely facing sockets each having a central contact, a spacer between and supporting said sockets, a bolt passing through said spacer and mechanically and electrically connecting said central contacts and a resistance coil mounted on said spacer.

8. The device of claim 7 in which said spacer is a hollow frame and said coil is held in said frame by said bolt, said bolt being removable to permit the easy installation and replacement of the sockets or the coil.

9. In a test set a pair of sockets each having a central contact, a spacer between said sockets, a bolt passing through the spacer and connecting said central contacts, a resistance coil carried by said spacer, said coil being electrically connected to the shell of one of the lamp sockets, a test cord electrically connected to said bolt, a test cord electrically connected to said coil, a test cord electrically connected to the shell of the other socket, a switch for short circuiting said resistance coil and a spring terminal for receiving the prong of any of said test cords.

10. An electrician's test set comprising a rubber casing, a fiber shell having a friction fit in said casing, a pair of lamps operatively mounted in said shell in spaced relation, a resistance unit removably mounted in said shell, a plurality of test cords passing through the wall of the casing and shell and electrically connected with said sockets and said resistance coil, a switch mounted on said shell for short circuiting said resistance, each of said cords having a test prong shaped to fit the terminals of a convenience outlet and a spring terminal on the base of one of said sockets for receiving any of said prongs, said casing and shell being apertured for admitting the prongs to said spring terminal.

ROBERT L. SCOGGIN.